(12) United States Patent
Lu

(10) Patent No.: US 7,783,874 B2
(45) Date of Patent: Aug. 24, 2010

(54) METHOD FOR INITIATING SYSTEM

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 670 days.

(21) Appl. No.: 11/751,965

(22) Filed: May 22, 2007

(65) Prior Publication Data

US 2008/0270671 A1 Oct. 30, 2008

(30) Foreign Application Priority Data

Apr. 24, 2007 (TW) ............................. 96114402 A

(51) Int. Cl.
*G06F 9/24* (2006.01)
*G06F 15/177* (2006.01)

(52) U.S. Cl. ............................. 713/1; 713/2; 713/100; 711/165

(58) Field of Classification Search ................ 713/1, 713/2, 100; 711/165
See application file for complete search history.

(56) References Cited

U.S. PATENT DOCUMENTS

| | | | |
|---|---|---|---|
| 6,865,669 B1* | 3/2005 | Mahmoud | 713/1 |
| 7,353,355 B1* | 4/2008 | Tormasov et al. | 711/165 |
| 2006/0282654 A1* | 12/2006 | Veen et al. | 713/1 |
| 2007/0083743 A1* | 4/2007 | Tsang | 713/1 |

\* cited by examiner

*Primary Examiner*—Thomas Lee
*Assistant Examiner*—Michael J Brown
(74) *Attorney, Agent, or Firm*—J.C Patents

(57) ABSTRACT

A method for initiating a system is provided. In the present invention, a specific data, which is not used for executing an initiating program of an interface device, is moved from a conventional memory to an extended memory temporarily, such that the available space of the conventional memory is increased. As a result, the computer system can have enough conventional memory space for loading and executing the initiating program of the interface device during a Power-On Self Test (POST) so as to achieve the purpose of initiating the system.

9 Claims, 4 Drawing Sheets

| Memory type | Address (4 bytes) | Size (32 bits) | Usage state |
|---|---|---|---|
| 0 | 00000h | 400h | 1 |
| 0 | 400h | 100h | 1 |
| ⋮ | ⋮ | ⋮ | ⋮ |
| 0 | A0000h | 60000h | 1 |
| 1 | 100000h | 1000000h | 0 |

METHOD FOR INITIATING SYSTEM

CROSS-REFERENCE TO RELATED APPLICATION

This application claims the priority benefit of Taiwan application serial no. 96114402, filed Apr. 24, 2007. All disclosure of the Taiwan application is incorporated herein by reference.

BACKGROUND OF THE INVENTION

1. Field of the Invention

The present invention generally relates to a method for initiating a system, more particularly, to a method for executing an initiating program of an interface device of a computer system.

2. Description of Related Art

In a conventional computer system, the memory blocks with memory addresses below 1M are referred to conventional memory while the memory blocks with memory addresses greater than or equal to 1M is referred to extended memory. During a Power-On Self Test (POST), the computer system needs a large amount of conventional memory for loading and executing an initiating program saved in an Option Read-Only-Memory (Option ROM) of an interface device.

For example, some of the more sophisticated computer system interface cards may require a large amount of conventional memory to execute a corresponding initiating program. However, the POST itself requires considerable memory space. When there is not enough conventional memory space for loading and executing the initiating program, the computer system can neither complete the initiation of the interface card nor perform the configuration of the interface card through other utility.

In brief, if the computer system cannot acquire enough conventional memory in the POST to execute the initiating program, some of the interface cards may not function. Additionally, the computer system may hang and have serious negative consequences if the condition is serious.

SUMMARY OF THE INVENTION

Accordingly, the present invention is directed to a method for initiating a system. The data in a conventional memory, which is not used for executing the initiating program, is moved to an extended memory temporarily so as to increase the available space of the conventional memory when a computer system executes an initiating program.

The present invention provides a method for initiating a system. The method is used for executing an initiating program of an interface device when a computer system executes a Power-On Self Test (POST). The method includes the following steps. First, a specific data in the conventional memory of a computer system is moved to an extended memory. The specific data is data not used for executing the initial program. Next, the initial program is loaded into the usable conventional memory for executing the initiating program. Finally, the specific data is restored from the extended memory to the conventional memory after completing the execution of the initiating program.

According to an embodiment of the present invention, the method for initiating a system further includes determining whether there is any initiating program that still has not been executed before moving the specific data from the conventional memory to the extended memory. If there is any initial program that has not been executed, then the specific data is moved.

According to the method for initiating a system in an embodiment of the present invention, the conventional memory can be sub-divided into several blocks, and the specific data includes data saved in the same or adjacent blocks.

According to the method for initiating a system in an embodiment of the present invention, the conventional memory further includes a memory management table for recording the usage state of each block of the conventional memory and the extended memory.

According to an embodiment of the present invention, the method for initiating a system further includes modifying the memory management table so that the block originally used for saving the specific data is relabeled 'usable' after the specific data is moved from the conventional memory to the extended memory.

According to the method for initiating a system in an embodiment of the present invention, the step of restoring the specific data from the extended memory back to the conventional memory includes restoring the specific data to the conventional memory through a basic input/output system, and modifying the memory management table so that the block in the conventional memory used for saving the specific data is labeled as 'used'.

According to the method for initiating a system in an embodiment of the present invention, the step of loading the initiating program into usable conventional memory includes loading part of the initiating program into a shadow memory of the conventional memory and executing this portion of the initiating program so as to load the remaining part of the initiating program into the usable conventional memory.

According to the method for initiating a system in an embodiment of the present invention, the step of loading the initiating program into usable conventional memory includes acquiring the usable conventional memory through a memory management program.

According to the method for initiating a system in an embodiment of the present invention, the memory management program includes a POST memory management program.

According to an embodiment of the present invention, the method for initiating a system further includes releasing the conventional memory used for executing the initiating program after the step of loading the initiating program into usable conventional memory and executing the initiating program.

According to the method for initiating a system in an embodiment of the present invention, the interface device includes a Peripheral Controller Interface (PCI).

According to the method for initiating a system in an embodiment of the present invention, the initiating program includes an Option Read-Only-Memory (Option ROM) saved in the interface device.

In the present invention, a specific data, which is not used for executing an initiating program of an interface device, is moved from a conventional memory to an extended memory temporarily so as to increase the usable conventional memory space. Therefore, the computer system can acquire enough conventional memory for loading and executing the initiating program of the interface device and achieve the purpose of initiating the system during the POST.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 shows a memory management table according to an embodiment of the present invention.

DESCRIPTION OF THE EMBODIMENTS

Figure 1:
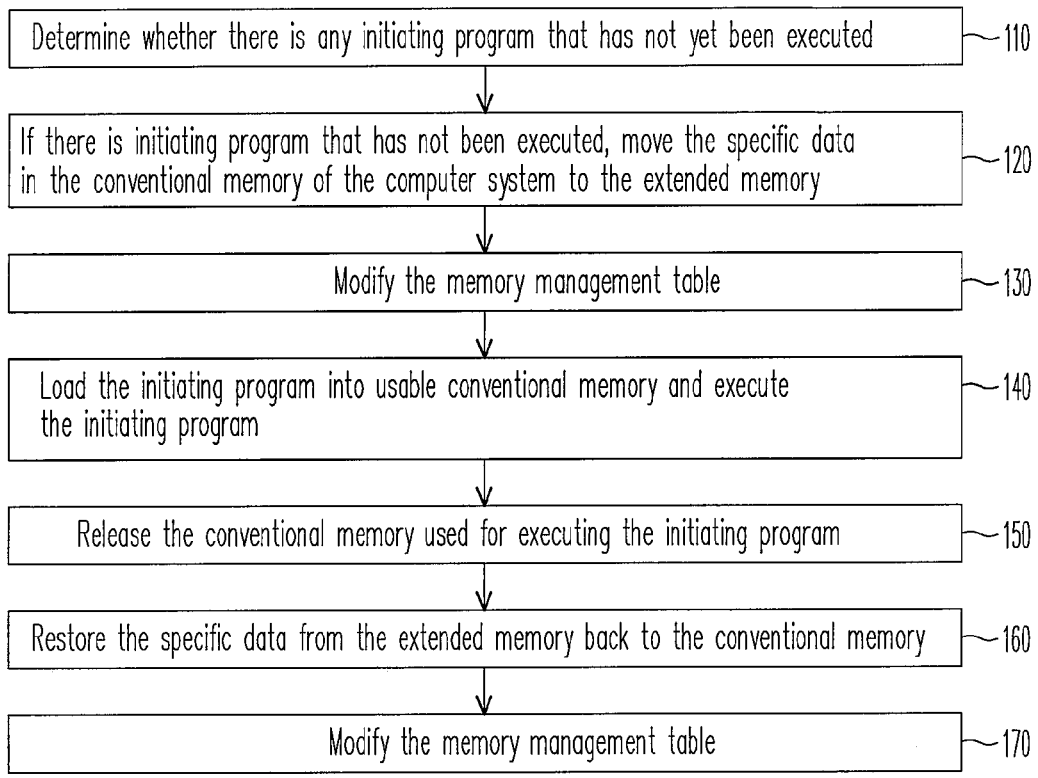
FIG. 1 is a flow diagram illustrating a method of initiating a system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

When a computer system is turned on and an initiating program is being executed, the space of conventional memory for loading and executing the initiating program can be increased if part of the data saved in the conventional memory is temporarily stored in an extended memory. Therefore, the problem of not being able to initiate the program of a computer system due to insufficient space in the conventional memory can be prevented. In the present invention, a method for initiating a system based on the aforementioned concept has been developed. To make the content of the present invention easier to understand, embodiments are provided and used as examples of implementation.

FIG. 1 is a flow diagram illustrating a method of initiating a system according to an embodiment of the present invention. In the present embodiment, the steps for initiating programs of interface devices after turning on a computer system with a number of interface devices are described. The interface devices can be Peripheral Controller Interface (PCI), and the initiating programs are saved in an Option Read-Only-Memory (Option ROM) of the interface devices, for example.

As shown in FIG. 1, a Power-On Self Test (POST) of a Basic Input/Output System (BIOS) is being executed after a computer system is turned on. First, in step 110, the computer system determines if there is any initiating program that has not been executed. The purpose of the initiating program is to initiate the interface device of the computer system and perform a configuration of the interface device so that the BIOS can communicate with the foregoing interface device and ensure the computer system can operate normally.

Next, in step 120, specific data saved in a conventional memory of the computer system, which is not used for executing an initiating program of an interface device, is moved to an extended memory if there is still an initiating program of a interface device that has not been executed. In the present embodiment, the conventional memory can be sub-divided into several blocks, and the specific data is saved in the same or adjacent blocks so as to facilitate subsequent transfer and management.

Figure 2:
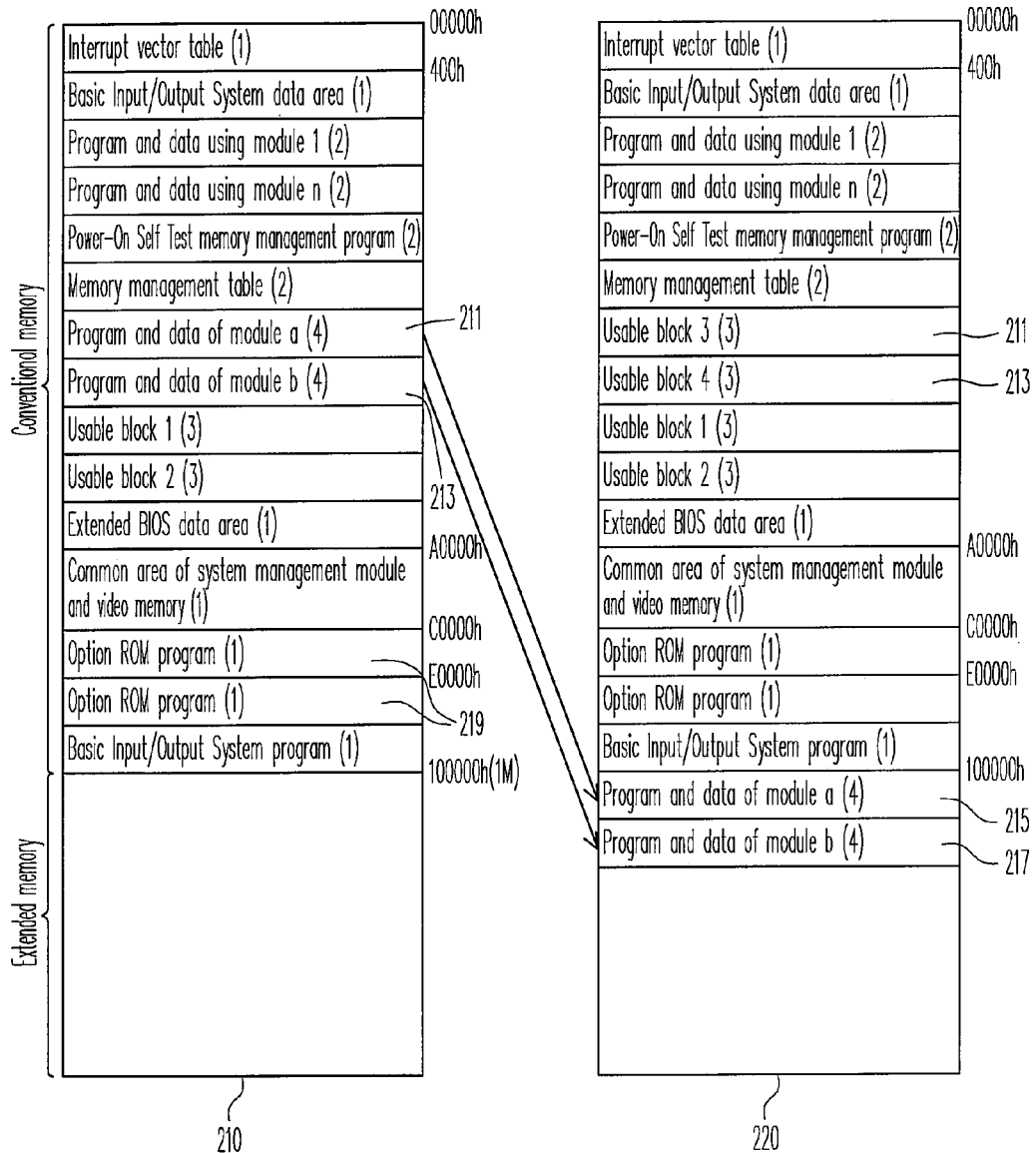
FIG. 2 shows a computer system memory according to an embodiment of the present invention.

For example, FIG. 2 shows a computer system memory according to an embodiment of the present invention. As shown in FIG. 2, the computer system memory 210 can be sub-divided into a conventional memory and an extended memory. The memory with an address below 1M is the conventional memory while the memory with an address greater than or equal to 1M is the extended memory. In the conventional memory, data, such as interrupt vector tables, POST memory management programs and BIOS programs, are saved. These data can be separated into four major classes according to their attributes. For example, those items in FIG. 2 marked with a '(1)' belong to a first class of data (for example, interrupt vector table, BIOS data area (BIOS BDA), extended BIOS data area (BIOS EBDA), PCI BIOS service program, BIOS INT 13h service program, PCI IRQ path table, Option ROM shadow memory and BIOS shadow memory). Since most of the first class of data has special functions, moving the data from its original storage address is usually unacceptable. Those items in FIG. 2 marked with a '(2)' belong to a second class of data (for example, POST memory management program and memory management table), which are data that may be accessed when the initiating program is being executed. Those items in FIG. 2 marked with a '(3)' belong to a third class of data, which can be used for loading and executing an initiating program. However, those items in computer system memory 210 marked with a '(4)' belong to a fourth class of data, which is the specific data (for example, the memory block 211 and the memory block 213) not used by an initiating program as mentioned in the aforementioned embodiment. Therefore, in step 120 of FIG. 1, the data saved in the memory block 211 and the memory block 213 are moved to a memory block 215 and a memory block 217 of the extended memory. The computer system memory 220 shows the configuration after moving the specific data.

In the present embodiment, the memory management table saved in the conventional memory is used for recording the usage state of each memory block of the conventional memory and the extended memory. For example, referring to the memory management table 300 shown in FIG. 3, the type of memory block is recorded in the first column of the memory management table 300. A '0' in the column indicates the memory block is a conventional memory and a '1' in the column indicates the memory block is an extended memory. The second and the third column record the address and the size of the block, respectively. The fourth column is used to record a usage state for each memory block. In the present embodiment, a usage state of '1' indicates a memory block that has been used while a usage state of '0' indicates a memory block that is usable.

In step 130 of FIG. 1, the block in the conventional memory originally used for saving the specific data is labeled as usable by modifying the memory management table after moving the specific data. Continuing with the foregoing example such as the computer system memory 220, the usage state fields in the memory management table corresponding to the memory block 211 and the memory block 213 are renewed to usable memory blocks.

Next, in step 140, usable conventional memory is acquired through, for example, the memory management program so as to load the initiating program into the conventional memory and execute the initiating program accordingly. It should be noted that, as shown in the computer system memory 210 of FIG. 2, the memory block 219 is the so-called 'shadow memory' for saving an Option ROM program. In the step of loading the initiating program into the shadow memory, part of the specific initiating program is first loaded into the shadow memory. In the process of executing this first loaded initiating program, the remaining initiating program is loaded into the usable conventional memory so as to execute the initiating action. In the present embodiment, the memory management program can be a POST memory management program, for example, but not limited to it.

Figure 4:
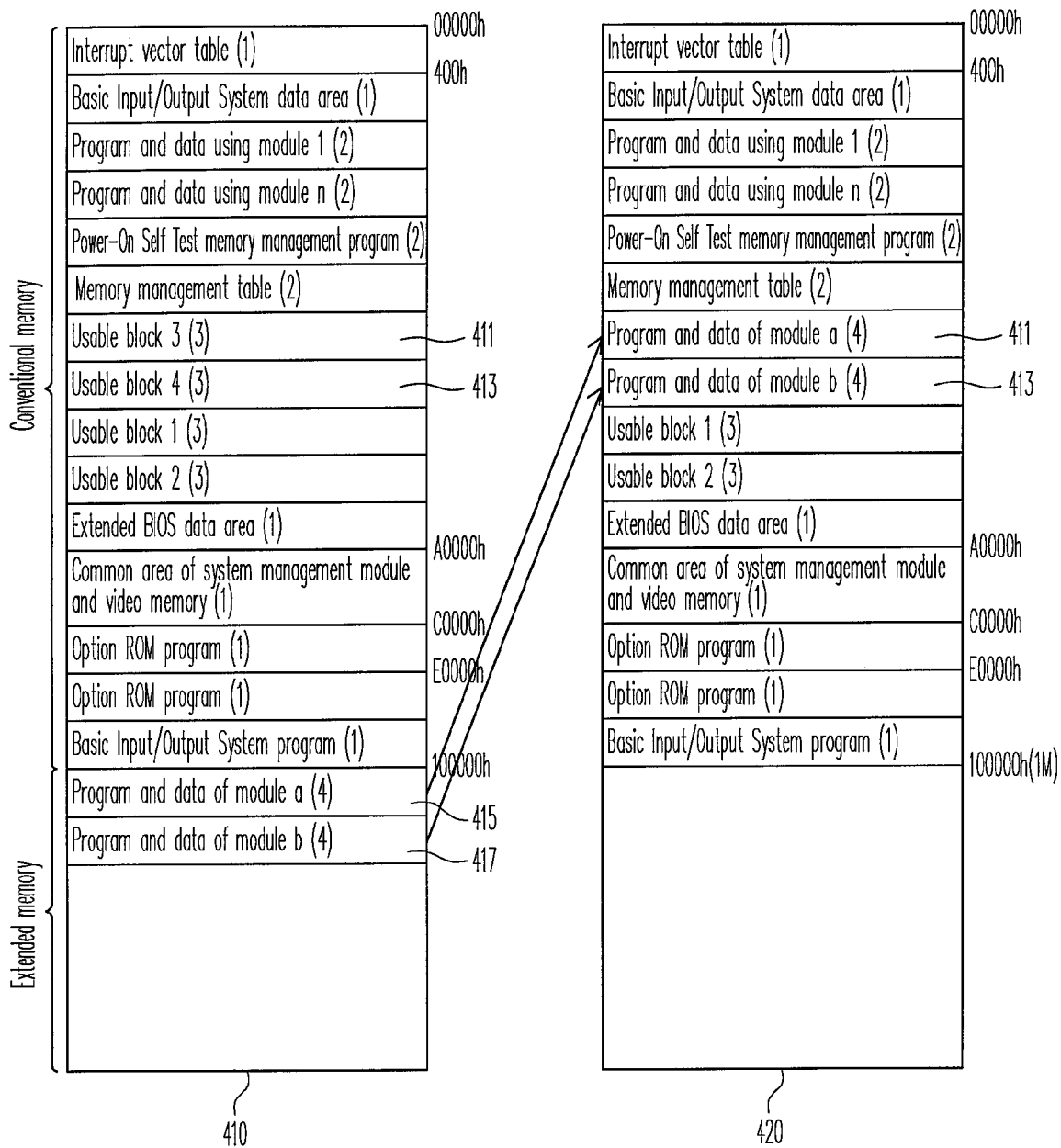
FIG. 4 shows a computer system memory according to another embodiment of the present invention.

In step 150, the conventional program used for executing the initiating program is released after completing the execution of the initiating program. Next, in step 160, the specific data previously moved to the extended memory is restored to the conventional memory. For example, as shown in FIG. 4, the specific data originally saved in the memory block 411 and the memory block 413 of the computer system memory 410 are temporarily moved to the memory block 415 and the memory block 417 so as to execute the initiating program. After completing the execution of the initiating program, the BIOS restores the specific data back to the conventional memory (that is, the data saved in the memory block 415 and the memory block 417 are restored back to the memory block 411 and the memory block 413). The computer system memory 420 shows the result after restoring the specific data to the conventional memory.

Finally, in step 170, the memory management table is modified so that the block of the conventional memory used for saving the specific data is labeled as 'used'. When the POST is being executed, the computer system can execute the initiating programs of all the interface devices by repeating the steps from 110 to 170. Accordingly, the initial configuration of the interface devices can be completely set during the power on process.

In summary, the method for initiating a system in the present invention includes moving a specific data, which is not used for executing an initiating program of an interface device, from a conventional memory to an extended memory temporarily during a POST of the computer system. Therefore, the available space of the conventional memory is increased. As a result, the computer system can dynamically acquire enough conventional memory space to load and execute the initiating programs of all the interface devices so that initiation of all the interface devices can be readily achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for initiating a system, used for executing an initiating program of an interface device while executing a Power-On Self Test (POST) of a computer system, the method comprising:

moving a specific data from a conventional memory of the computer system to an extended memory, wherein the specific data is the data not used for executing the initiating program, the conventional memory is sub-divided into several blocks, and the conventional memory comprises a memory management table for recording a usage state of each of the blocks and the extended memory;

modifying the memory management table so as to label the block of conventional memory originally used for saving the specific data as 'usable';

loading the initiating program into a usable conventional memory so as to execute the initiating program; and restoring the specific data from the extended memory back to the conventional memory through a Basic Input/Output System (BIOS) after completing the execution of the initiating program, and modifying the memory management table so as to label the block of conventional memory for saving the specific data as 'used'.

2. The method for initiating a system according to claim 1, wherein, before the step of moving the specific data from the conventional memory to the extended memory, further comprising:

determining whether there is any initiating program that has not been executed; and moving the specific data if there is initiating program that has not been executed.

3. The method for initiating a system according to claim 1, wherein the specific data comprise data that are saved in the same block or adjacent blocks.

4. The method for initiating a system according to claim 1, wherein the step of loading the initiating program into the usable conventional memory comprises:

loading part of the initiating program into a shadow memory of the conventional memory; and executing loaded part of the initiating program so as to load the remaining part of the initiating program to the usable conventional memory.

5. The method for initiating a system according to claim 1, wherein the step of loading the initiating program into the usable conventional memory comprises:

acquiring the usable conventional memory through a memory management program.

6. The method for initiating a system according to claim 5, wherein the memory management program comprises a POST memory management program.

7. The method for initiating a system according to claim 1, wherein, after the step of loading the initiating program into the usable conventional memory so as to execute the initiating program, further comprising:

releasing the conventional memory used for executing the initiating program.

8. The method for initiating a system according to claim 1, wherein the interface device comprises a Peripheral Controller Interface (PCI).

9. The method for initiating a system according to claim 1, wherein the initiating program comprises an Option Read-Only-Memory (Option ROM) saved in the interface device.

* * * * *